United States Patent [19]

Tambo et al.

[11] Patent Number: 5,663,327

[45] Date of Patent: Sep. 2, 1997

[54] HYDROXYGALLIUM PHTHALOCYANINE CRYSTAL, PROCESS FOR PRODUCING THE SAME, AND ELECTROPHOTOGRAPHIC PHOTORECEPTOR CONTAINING THE SAME

[75] Inventors: Fumiaki Tambo, Minami-ashigara, Japan; Katsumi Daimon, Mississauga, Canada; Yasuo Sakaguchi; Kazuo Yamasaki, both of Minami-ashigara, Japan

[73] Assignee: Fuji Xerox Co., Ltd., Tokyo, Japan

[21] Appl. No.: 536,786

[22] Filed: Sep. 29, 1995

[30] Foreign Application Priority Data

Sep. 30, 1994 [JP] Japan .................................. 6-259806

[51] Int. Cl.$^6$ .................................................... C09B 47/04
[52] U.S. Cl. ........................ 540/139; 540/140; 540/141
[58] Field of Search ............................ 540/139, 141, 540/143; 430/78

[56] References Cited

U.S. PATENT DOCUMENTS

| | | | |
|---|---|---|---|
| 2,770,629 | 11/1956 | Eastes ................... | 260/314.5 |
| 3,160,635 | 12/1964 | Knudsen et al. ......... | 260/314.5 |
| 3,357,989 | 12/1967 | Byrne et al. ........... | 260/314.5 |
| 3,708,292 | 1/1973 | Brach et al. ............ | 96/1.5 |
| 5,463,044 | 10/1995 | Nukada et al. .......... | 540/143 |
| 5,482,811 | 1/1996 | Keoshkerian et al. .... | 540/135 |
| 5,508,395 | 4/1996 | Daimon et al. ......... | 540/141 |

OTHER PUBLICATIONS

*Inorg. Chem.*, John Linsky, et al., "Studies of Series of Haloaluminium, –gallium, and –indium Phtalocyanines", 1980, vol. 19, pp. 3131–3135.

*Bull. Soc. Chim. France* $M^{me}$ Denise Colaitis, "No. 2.—Étude de quelques dérivés de la phtalocyanine discussion des divers modes d'obtention, 1.—Phtalocyanines d'éleménts de valence supérieure à deux", 1962, pp. 23–26.

*D.C.R. Académie Des Sciences*, $M^{me}$ Denise Colaitis, "Chimie Des Complexes, Sur quelques dérivés de la phtalocyanine", 1956, vol. 242, pp. 1026–1027.

*AIP Conf. Proc.*, P. Lee et al. "Surface Chemistries and Electronic Properties of Molecular Semiconductor Thin Films Grown by Effusion Beams", 1988, vol. 167, pp. 376–385.

*Proc. Electrochem Soc.*, N.R. Armstrong, et al. "Characterization of Thin Film Molecular Semiconductors Using Photoelectrochemistry and Microcircuit Photoconductivity Measurements" 1988, 88–14, pp. 267–279.

*J. Phys. Chem.*, T.J. Klofta, et al. "Photoelectrochemical and Spectroscopic Characterization of Thin Films of Titanyl Phthalocyanine: Comparisons with Vanadyl Phthalocyanine", 1987, vol. 91, pp. 5646–5651.

*Primary Examiner*—Mukund J. Shah
*Assistant Examiner*—Pavanaram K. Sripada
*Attorney, Agent, or Firm*—Oliff & Berridge

[57] ABSTRACT

Hydroxygallium phthalocyanine crystals having intense diffraction peaks at Bragg angles ($2\theta\pm0.2°$) of 7.5°, 9.9°, 12.5°, 16.3°, 18.6°, 25.1° and 28.3° in CuKα characteristic X-ray diffractometry, a process for producing the same, and an electrophotographic photoreceptor containing the same are disclosed. The hydroxygallium phthalocyanine crystals are obtained by once preparing impurity-free hydroxygallium phthalocyanine having intense X-ray diffraction peaks at specific Bragg angles, followed by a solvent treatment for crystal transformation, in which the impurity-free crystals are prepared by using excess phthalocyanine ring-forming compound in the synthesis of starting gallium phthalocyanine or by removing insoluble matter from the acid paste of starting gallium phthalocyanine.

4 Claims, 1 Drawing Sheet

HYDROXYGALLIUM PHTHALOCYANINE CRYSTAL, PROCESS FOR PRODUCING THE SAME, AND ELECTROPHOTOGRAPHIC PHOTORECEPTOR CONTAINING THE SAME

FIELD OF THE INVENTION

This invention relates to a novel hydroxygallium phthalocyanine crystal useful as a photoconductive material, a process for producing the same, and an electrophotographic photoreceptor containing the same.

BACKGROUND OF THE INVENTION

In the field of electrophotographic photoreceptors, there has recently been an increasing demand to extend the photosensitive wavelength region of conventional organic photoconductive materials to a wavelength region of a semiconductor laser in the near infrared light region (780 to 830 nm) so as to make them applicable to a digital recording system, such as a laser printer. From this point of view, there have been reported photoconductive materials for semiconductor lasers, such as squarylium compounds as disclosed in JP-A-49-105536 and JP-A-58-21416, triphenylamine type tris-azo compounds as disclosed in JP-A-61-151659, and phthalocyanine compounds as disclosed in JP-A-48-34189 and JP-A-57-148745 (the term "JP-A" as used herein means an "unexamined published Japanese patent application").

In cases where an organic photoconductive material is used as a photosensitive material for semiconductor lasers, it is required to have a photosensitive wavelength region extended to a longer side and to provide a photoreceptor having satisfactory sensitivity and durability. None of the above-described conventional organic photoconductive materials sufficiently satisfies these requirements.

In order to overcome the drawbacks of the conventional organic photoconductive materials, the relationship between their crystal form and electrophotographic characteristics has been studied. In particular, many reports have hitherto been made on phthalocyanine compounds.

It is known that phthalocyanine compounds generally exhibit several different crystal forms depending on the process of synthesis or the process of treatment and that the difference in crystal form has a great influence on their photoelectric conversion characteristics. For example, known crystal forms of copper phthalocyanine compounds include α-, π-, χ-, ρ-, γ-, and δ-forms as well as a stable β-form. These crystal forms are known capable of interconversion by application of a mechanical strain, sulfuric acid treatment, organic solvent treatment, heat treatment, and the like as described, e.g., in U.S. Pat. Nos. 2,770,629, 3,160, 635, 3,708,292, and 3,357,989. JP-A-50-38543 refers to the relationship between a crystal form of copper phthalocyanine and its electrophotographic characteristics. As for gallium phthalocyanine crystal forms, JP-A-1-221459 describes two crystal forms obtained by acid pasting. Further, the inventors of the present invention previously revealed that five crystal forms of hydroxygallium phthalocyanine exhibit excellent electrophotographic characteristics (see JP-A-5-263007).

For the production of these crystals, a so-called acid pasting process as described in Bull. Soc. Chim., 23, France (1962) is adopted. That is, a starting gallium phthalocyanine compound is subjected to acid pasting to once obtain metastable hydroxygallium phthalocyanine, which is then subjected to a solvent treatment for transformation.

Starting gallium phthalocyanine to be used in acid pasting includes chlorogallium phthalocyanine (see D.C.R. Acad. Sci., Vol. 242, p. 1026 (1956), JP-B-3-30854 (the term "JP-B" as used herein means an "examined published Japanese patent application"), JP-A-1-221459, and Inorg. Chem., Vol. 19, p. 3131 (1980)), bromogallium phthalocyanine (see JP-A-59-133551), and iodogallium phthalocyanine (see JP-A-60-59354).

However, hydroxygallium phthalocyanine having a specific crystal form which is prepared by usual acid pasting, even with the crystal form being equal, show variation in performance as a electrophotographic photoreceptor, such as sensitivity and a dark decay rate, and it has been difficult to obtain hydroxygallium phthalocyanine which provides stable image characteristics.

SUMMARY OF THE INVENTION

An object of the present invention is to provide hydroxygallium phthalocyanine having a novel crystal form which exhibits excellent characteristics required as a photoconductive material.

Another object of the present invention is to provide a process for producing the hydroxygallium phthalocyanine crystals.

A further object of the present invention is to provide an electrophotographic photoreceptor containing the hydroxygallium phthalocyanine crystals.

The present inventors have conducted extensive investigations on production of hydroxygallium phthalocyanine crystals and, as a result, found that hydroxygallium phthalocyanine crystals having intense diffraction peaks at specific Bragg angles obtained by a specific process exhibit excellent characteristics as a photoconductive material, the process being characterized by such a manipulation that is added to the mode of preparing gallium phthalocyanine so as to prevent a starting gallium compound from remaining in a final product or such a manipulation that is added to the mode of acid pasting so as to remove an insoluble matter from an acid paste of gallium phthalocyanine. The present invention has been completed based on this finding.

The present invention provides a process for producing hydroxygallium phthalocyanine crystals, which process comprises reacting a gallium compound with an excess of a compound forming a phthalocyanine ring to prepare gallium phthalocyanine, subjecting the resulting gallium phthalocyanine to acid pasting to obtain a hydroxygallium phthalocyanine crystal having intense diffraction peaks at Bragg angles ($2\theta\pm0.2°$) of 6.9°, 13.2° to 14.2°, 16.5°, and 26.4° or of 7.0°, 13.4°, 16.6°, 26.0°, and 26.7° in CuKα characteristic X-ray diffractometry, and transforming the resulting crystal by a solvent treatment into hydroxygallium phthalocyanine crystals having intense diffraction peaks at Bragg angles ($2\theta\pm0.2°$) of 7.5°, 9.9°, 12.5°, 16.3°, 18.6°, 25.1°, and 28.3° in CuKα characteristic X-ray diffractometry.

The present invention also provides a process for producing a hydroxygallium phthalocyanine crystal, which process comprises removing an insoluble matter from an acid paste of gallium phthalocyanine in an acid pasting process to prepare a hydroxygallium phthalocyanine crystal having intense diffraction peaks at Bragg angles ($2\theta\pm0.2°$) of 6.9°, 13.2° to 14.2°, 16.5°, and 26.4° or of 7.0°, 13.4°, 16.6°, 26.0°, and 26.7° in CuKα characteristic X-ray diffractometry, and transforming the resulting crystal by a solvent treatment into a hydroxygallium phthalocyanine crystal having intense diffraction peaks at Bragg angles ($2\theta\pm0.2°$) of 7.5°, 9.9°, 12.5°, 16.3°, 18.6°, 25.1°, and 28.3° in CuKα characteristic X-ray diffractometry.

The present invention further provides a novel hydroxygallium phthalocyanine crystal prepared by the above processes and an electrophotographic photoreceptor containing these crystals as a photoconductive material.

DETAILED DESCRIPTION OF THE INVENTION

Figure 1:
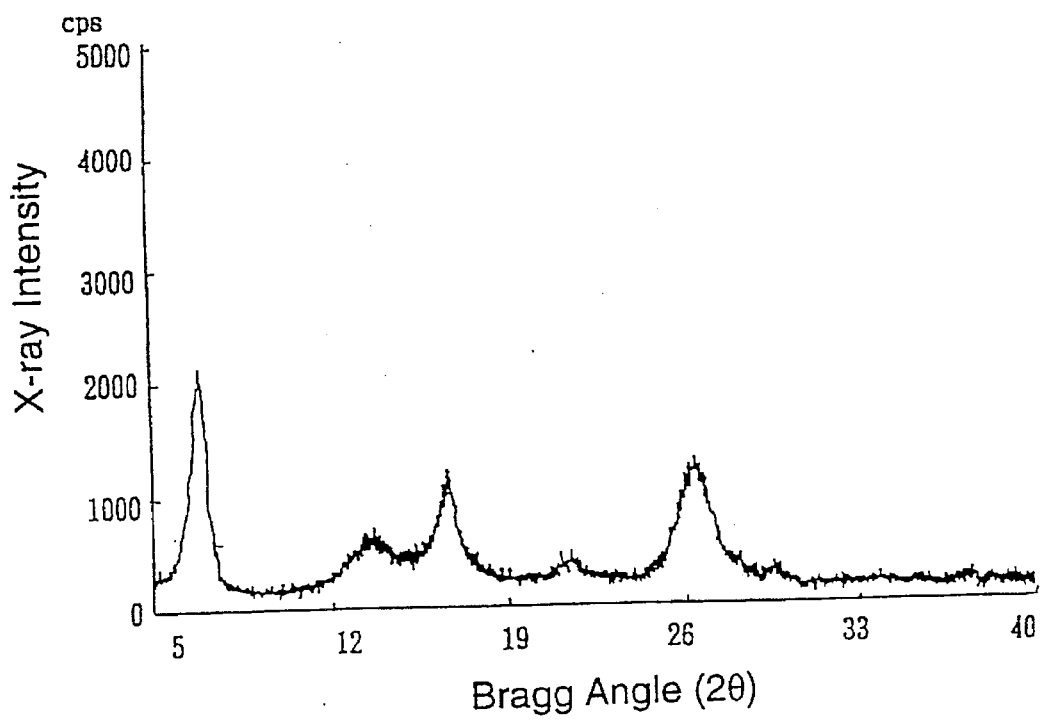
FIG. 1 is a powder X-ray diffraction pattern of the hydroxygallium phthalocyanine crystal obtained in Example 1(b).

The present invention is based on the finding that impurity in hydroxygallium phthalocyanine crystals gives great influences on electrophotographic characteristics. Crystals as synthesized often contain the starting gallium compound or intermediate products derived therefrom, which seem to form, in the subsequent operation such as acid pasting, GaO(OH), etc. which would cause reduction of electrophotographic characteristics.

In one embodiment of the present invention, the starting gallium phthalocyanine, which is to be subjected to acid pasting, is prepared by using a compound forming a phthalocyanine ring in excess of a gallium compound thereby to suppress remaining of the gallium compound in the final product. In another embodiment of the present invention a step of removing an insoluble matter, such as GaO(OH), from acid paste of gallium phthalocyanine is added to an acid pasting process. By these manipulations there is provided a hydroxygallium phthalocyanine crystal having intense diffraction peaks at Bragg angles ($2\theta\pm0.2°$) of 6.9°, 13.2° to 14.2°, 16.5°, and 26.4° or of 7.0°, 13.4°, 16.6°, 26.0°, and 26.7° in CuKα characteristic X-ray diffractometry, which are then transformed by a solvent treatment into a hydroxygallium phthalocyanine crystal having intense diffraction peaks at Bragg angles ($2\theta\pm0.2°$) of 7.5°, 9.9°, 12.5°, 16.3°, 18.6°, 25.1°, and 28.3° in CuKα characteristic X-ray diffractometry.

In the first embodiment, gallium phthalocyanine is synthesized by using a compound forming a phthalocyanine ring in excess over an equivalent amount, e.g., 1.05 to 2 equivalents, preferably 1.05 to 1.4 equivalent, still preferably 1.1 to 1.25 equivalent, per equivalent of gallium.

The compound forming a phthalocyanine ring includes phthalonitrile, 3-methylphthalonitrile, 3,4-dimethylphthalonitrile, 3-chlorophthalonitrile, 3,4-dichlorophthalonitrile, 3-nitrophthalonitrile, 3,4-dinitrophthalonitrile, 3-cyanophthalonitrile, 3,4-dicyanophthalonitrile, 2-methylphthalonitrile, 2-chlorophthalonitrile, 2-nitrophthalonitrile, 2-cyanophthalonitrile, diminoisoindoline, 5-methyldiiminoisoindoline, 5,6-dimethyldiiminoisoindoline, 5-chlorodiiminoisoindoline, 5,6-dichlorodiiminoisoindoline, 5-nitrodiiminoisoindoline, 5,6-dinitrodiiminoisoindoline, 5-cyanodiiminoisoindoline, 5,6-dicyanodiiminoisoindoline, 4-methyldiiminoisoindoline, 4-chlorodiiminoisoindoline, 4-nitrodiiminoisoindoline, and 4-cyanodiiminoisoindoline. Phthalonitrile and diiminoisoindoline are preferred of them.

The gallium compound includes gallium chloride, gallium bromide, gallium iodide, gallium fluoride, gallium trimethoxide, gallium triethoxide, gallium tripropoxide, and acetylacetonatogallium.

It is particularly preferred to synthesize gallium phthalocyanine by starting with a gallium trialkoxide which is prepared in situ from, e.g., gallium chloride and sodium methoxide.

The reaction between a gallium compound and excess phthalocyanine ring-forming compound is carried out at a temperature of 100° to 230° C., preferably 140° to 200° C., for a period of 3 to 48 hours, preferably 6 to 30 hours.

The thus synthesized gallium phthalocyanine is subjected to acid pasting to obtain a hydroxygallium phthalocyanine crystal having intense diffraction peaks at Bragg angles ($2\theta\pm0.2°$) of 6.9°, 13.2° to 14.2°, 16.5°, and 26.4° or of 7.0°, 13.4°, 16.6°, 26.0°, and 26.7° in CuKα characteristic X-ray diffractometry.

Electrophotographic photoreceptors containing hydroxygallium phthalocyanine crystals prepared by starting with the hydroxygallium phthalocyanine crystals according to the first embodiment exhibit improved electrophotographic characteristics. This is probably because shortage of the phthalocyanine-forming compound due to decomposition, and the like is compensated for by the excess and therefore such compounds that might by-produce GaO(OH), etc. are prevented from remaining or being produced in the reaction system.

Gallium phthalocyanine compounds which can be used as a starting material in the second embodiment of the present invention include chlorogallium phthalocyanine, bromogallium phthalocyanine, and iodogallium phthalocyanine. These gallium phthalocyanine compounds can be synthesized by known methods and are not limited in method of synthesis. The gallium phthalocyanine described in JP-A-6-73299, which is synthesized by using a gallium trialkoxide, is also useful.

The acid pasting according to the present invention (common to the first and second embodiments) is carried out by dissolving or dispersing a gallium phthalocyanine compound in an acid to prepare an acid paste and adding the acid paste (i) to an aqueous alkali solution to obtain a hydroxygallium phthalocyanine crystal having intense diffraction peaks at Bragg angles ($2\theta\pm0.2°$) of 6.9°, 13.2° to 14.2°, 16.5° and 26.4° in CuKα characteristic X-ray diffractometry, or (ii) to a mixture of an aqueous alkali solution and an organic solvent to obtain a hydroxygallium phthalocyanine crystal having intense diffraction peaks at Bragg angles ($2\theta\pm0.2°$) of 7.0°, 13.4°, 16.6°, 26.0° and 26.7° in CuKα characteristic X-ray diffractometry.

The acid to be used in acid pasting includes sulfuric acid, hydrochloric acid, hydrobromic acid, and trifluoroacetic acid. Concentrated sulfuric acid is preferred for its high dissolving power and ease of handling. Concentrated sulfuric acid is used in an amount 5 to 100 times, preferably 15 to 40 times, the weight of gallium phthalocyanine.

The organic solvent to be used in acid pasting includes alcohols, such as methanol; glycols, such as ethylene glycol, glycerin, and polyethylene glycol; ketones, such as acetone and methyl ethyl ketone; esters, such as ethyl acetate and butyl acetate; halogenated hydrocarbons, such as dichloromethane and chloroform; and aromatic hydrocarbons, such as toluene and xylene. The organic solvent is used in an amount 10 or less times, preferably 5 or less times, the volume of water. The alkali to be used includes sodium hydroxide, potassium hydroxide, sodium carbonate, potassium carbonate, ammonia, and various ammonium hydroxide salts. The mixture of an aqueous alkali solution and an organic solvent is used in an amount 1 to 100 times, preferably 3 to 20 times the volume of the acid paste of gallium phthalocyanine.

The acid pasting is conducted at a temperature ranging from −15° to 100° C. In using an organic solvent, a temperature lower than the boiling point of the solvent is recommended.

In the second embodiment of the present invention, the acid paste is filtered through a filter insusceptible to corrosion of acid, such as a glass filter or a ceramic filter in order to remove impurity from the acid paste. Filtration is carried out by suction from the bottom of the filter, by pressuring from the top of the filter, or by both. The filtered acid paste is added dropwise to an aqueous alkali solution or a mixture of an aqueous alkali solution and an organic solvent with stirring while maintaining at a temperature of the boiling point or below, whereupon hydroxygallium phthalocyanine is produced. The acid paste may be filtered either prior to the dropwise addition or simultaneously with the addition. The resulting hydroxygallium phthalocyanine crystal is purified by washing with water and the like to give a hydroxygallium phthalocyanine crystal having intense diffraction peaks at Bragg angles (2θ±0.2°) of 6.9°, 13.2° to 14.2°, 16.5°, and 26.4° or of 7.0°, 13.4°, 16.6°, 26.0°, and 26.7° in CuKα characteristic X-ray diffractometry. Electrophotographic photoreceptors containing hydroxygallium phthalocyanine crystals prepared from the hydroxygallium phthalocyanine crystals according to the second embodiment exhibit improved electrophotographic characteristics. This is probably because compounds that would have by-produced GaO(OH), etc. have been removed by filtration.

The manipulation consisting of use of excess phthalocyanine ring-forming compound over a gallium compound in the synthesis of a starting gallium phthalocyanine compound and the manipulation consisting of removing an insoluble matter from an acid paste during acid pasting may be effected singly, or both of them may be effected in series.

The thus obtained hydroxygallium phthalocyanine crystal is then subjected to solvent treatment. Solvent treatment induces crystal transformation to give a desired hydroxygallium phthalocyanine crystal having intense diffraction peaks at Bragg angles (2θ±0.2°) of 7.5°, 9.9°, 12.5°, 16.3°, 18.6°, 25.1°, and 28.3° in CuKα characteristic X-ray diffractometry.

The solvent which can be used for the solvent treatment includes amides, such as N,N-dimethylformamide, N,N-dimethylacetamide, N-methylpyrrolidone, and 1,3-dimethyl-2-imidazolidinone; sulfoxides, such as dimethyl sulfoxide; and organic amines, such as morpholine and piperidine. The solvent used in the preparation of hydroxygallium phthalocyanine crystals may be a mixture of two or more of the above-enumerated solvents or a mixture of the above-enumerated solvent and water.

The above-mentioned solvent treatment embraces not only an ordinary recrystallization treatment but other operations such as washing, wet grinding, immersion, and suspending with stirring.

The solvent is used in an amount of 1 to 200 parts by weight, preferably 10 to 100 parts by weight, per part by weight of hydroxygallium phthalocyanine. The treatment is carried out at a temperature of 0° to 150° C., preferably room temperature to 100° C. The treatment may be conducted either by allowing the system to stand in an appropriate container or stirring the system. Further, the hydroxygallium phthalocyanine may be wet ground with the prescribed solvent by means of a ball mill, a mortar, a sand mill, a kneader, an attritor, etc. An inorganic compound, such as sodium chloride or sodium sulfate, or a grinding aid, such as glass beads, steel beads or alumina beads, may be used in wet grinding.

The above-mentioned solvent treatment provides hydroxygallium phthalocyanine of novel crystal form having satisfactory crystal properties and a regular particle size.

The electrophotographic photoreceptor according to the present invention in which the above-described hydroxygallium phthalocyanine crystals are used as a photoconductive material in the photosensitive layer thereof will be explained below.

The photosensitive layer may have either a single layer structure or a laminate structure composed of a charge generating layer and a charge transporting layer. In the latter structure, the photosensitive layer comprises a conductive support having provided thereon a photosensitive layer composed of a lower charge generating layer and an upper charge transporting layer, in which the charge generating layer is formed of the hydroxygallium phthalocyanine crystals of the present invention and a binder resin. An undercoat layer is preferably provided between the photosensitive layer and the conductive support.

The charge generating layer is formed by coating a conductive support with a coating composition prepared by dispersing the hydroxygallium phthalocyanine crystals in an organic solvent solution of a binder resin. Binder resins which can be used in the charge generating layer can be chosen from a broad range of insulating resins, such as a polyvinyl butyral resin and a polyvinyl formal resin. Solvents which can be used for dissolving the binder resin are preferably chosen from among those incapable of dissolving the undercoat layer. A suitable weight ratio of hydroxygallium phthalocyanine crystals to binder resin ranges from 40:1 to 1:20. Dispersing of the hydroxygallium phthalocyanine crystals in the resin solution can be carried out in a usual manner by means of a ball mill, an attritor, a sand mill, etc.

Coating can be effected by dip coating, spray coating, spinner coating, bead coating, wire bar coating, blade coating, roller coating, air knife coating, curtain coating, and the like. The thickness of the charge generating layer is suitably 0.05 to 5 μm.

The charge transporting layer is formed of an appropriate binder resin having dispersed therein a known charge transporting material, such as N,N'-diphenyl-N,N'-bis(m-tolyl)benzidine, 4-diethylaminobenzaldehyde-2,2-diphenylhydrazone, and p-(2,2-diphenylvinyl)-N,N-diphenylaniline.

The charge transporting layer is formed by coating a charge generating layer with a coating composition prepared from a charge transporting material and the same binder resin and solvent as used in the formation of a charge generating layer by the same coating means. A suitable weight ratio of charge transporting material to binder resin ranges from 10:1 to 1:5. The charge transporting layer usually has a thickness of 5 to 50 μm.

Where a photosensitive layer has a single layer structure, the photosensitive layer comprises a photoconductive layer in which the hydroxygallium phthalocyanine crystals of the present invention are dispersed in a charge transporting material and a binder resin. The charge transporting material and binder resin and the coating technique used here are the same as those used in the formation of a photosensitive layer having a laminate structure. A suitable weight ratio of charge transporting material to binder resin is about 1:10 to 10:1, preferably about 1:2 to 2:1, and a suitable weight ratio of hydroxygallium phthalocyanine crystals to binder resin is from about 1:100 to 5:1, preferably about 1:10 to 1:1.

Any conductive support may be used as far as it is fit to use as an electrophotographic photoreceptor.

If desired, an undercoat layer comprising a polyamide resin, a polycarbonate resin, a zirconium chelate compound, a titanyl chelate compound, etc. may be provided between the conductive support and the photosensitive layer in order to block injection of unnecessary charges from the conductive support into the photosensitive layer on charging of the photosensitive layer.

If desired, the surface of the photosensitive layer may be covered with a protective (overcoat) layer. A protective layer functions to prevent the charge transporting layer of a photosensitive layer having a laminate structure from being chemically denatured on charging and also to improve mechanical strength of the photosensitive layer.

The present invention will now be illustrated in greater detail with reference to Examples, but it should be understood that the present invention is not deemed to be limited thereto. Unless otherwise indicated, all the parts and percents are given by weight.

EXAMPLE 1

(a) In 75 ml of toluene was dissolved 10 parts of gallium chloride, and 33 ml of a 28% methanolic solution of sodium methoxide was added thereto dropwise while cooling. After stirring for about 30 minutes, 33.5 parts of phthalonitrile (corresponding to 1.15 equivalent per equivalent of gallium chloride) and 150 ml of ethylene glycol were added thereto, followed by stirring at 180° C. for 24 hours in a nitrogen atmosphere. The product was collected by filtration, washed successively with N,N-dimethylformamide and distilled water, and dried to give 27.8 parts of gallium phthalocyanine.

(b) Ten parts of the gallium phthalocyanine prepared in (a) above were dissolved in 250 parts of concentrated sulfuric acid and stirred for 2 hours. The resulting acid paste was added dropwise to an ice-cooled mixed solution consisting of 870 ml of distilled water and 530 ml of concentrated aqueous ammonia. The crystals thus precipitated were thoroughly washed with distilled water and dried to give 9 parts of hydroxygallium phthalocyanine crystals. The powder X-ray diffraction spectrum of the crystals is shown in FIG. 1.

Figure 2:
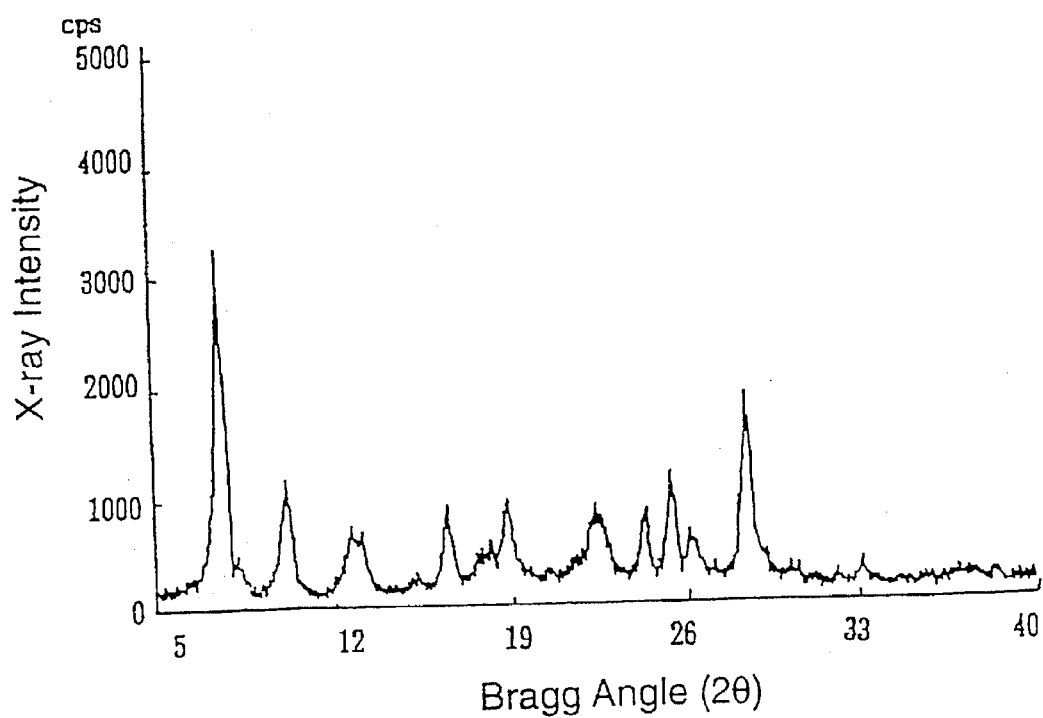
FIG. 2 is a powder X-ray diffraction pattern of the hydroxygallium phthalocyanine crystal obtained in Example 1(c).

(c) One part of the hydroxygallium phthalocyanine crystals prepared in (b) above was milled in 15 parts of N,N-dimethylformamide together with 30 parts of glass beads having a diameter of 1 mm for 24 hours. The crystals were separated, washed with n-butyl acetate, and dried at 50° C. under reduced pressure of 20 Pa for 8 hours. Any residual solvent was removed to give 0.9 part of hydroxygallium phthalocyanine crystals. The powder X-ray diffraction spectrum of the crystals is shown in FIG. 2.

EXAMPLE 2

(a) In 75 ml of toluene was dissolved 10 parts of gallium chloride, and 33 ml of a 28% methanolic solution of sodium methoxide was added thereto dropwise while cooling. After stirring for about 30 minutes, 29.1 parts of phthalonitrile (equivalent to gallium chloride) and 150 ml of ethylene glycol were added thereto, followed by stirring at 180° C. for 24 hours in a nitrogen atmosphere. The product was collected by filtration, washed successively with N,N-dimethylformamide and distilled water, and dried to give 28.0 parts of gallium phthalocyanine.

(b) Ten parts of the gallium phthalocyanine prepared in (a) above were dissolved in 250 parts of concentrated sulfuric acid and stirred for 2 hours. Any insoluble matter of the resulting acid paste was removed by filtration through a 1.5 μm glass filter, and the filtrate was added dropwise to an ice-cooled mixed solution consisting of 870 ml of distilled water and 530 ml of concentrated aqueous ammonia. The crystals thus precipitated were thoroughly washed with distilled water and dried to give 9 parts of hydroxygallium phthalocyanine crystals. The powder X-ray diffraction spectrum of the crystals was the same as that shown in FIG. 1.

(c) The hydroxygallium phthalocyanine crystals prepared in (b) above subjected to the same solvent treatment as in Example 1(c) to obtain 0.9 part of hydroxygallium phthalocyanine crystals. The powder X-ray diffraction spectrum of the crystals was the same as that shown in FIG. 2.

COMPARATIVE EXAMPLE 1

Ten parts of the gallium phthalocyanine obtained in Example 2(a) were dissolved in 250 parts of concentrated sulfuric acid and stirred for 2 hours. The resulting acid paste as prepared was added dropwise to an ice-cooled mixed solution consisting of 870 ml of distilled water and 530 ml of concentrated aqueous ammonia. The crystals thus precipitated were thoroughly washed with distilled water and dried to give 9 parts of hydroxygallium phthalocyanine crystals. The powder X-ray diffraction spectrum of the crystals was the same as that shown in FIG. 1.

One part of the resulting hydroxygallium phthalocyanine crystals was milled in 15 parts of N,N-dimethylformamide together with 30 parts of glass beads having a diameter of 1 mm for 24 hours. The crystals were separated, washed with n-butyl acetate, and dried at 50° C. under reduced pressure of 20 Pa for 8 hours. Any residual solvent was removed to give 0.9 part of hydroxygallium phthalocyanine crystals. The powder X-ray diffraction spectrum of the crystals was the same as that shown in FIG. 2. The half-widths of the diffraction peak of the solvent-treated hydroxygallium phthalocyanine crystal at a Bragg angle ($2\theta \pm 0.2°$) of 7.5° in Example 2(C) and Comparative Example 1 were 0.420 and 0.435, respectively. This shows that the solvent-treated hydroxygallium phthalocyanine crystal of the present invention has excellent crystal properties. Further, when compared transmission electron microscope (TEM) photographs of the solvent-treated hydroxygallium phthalocyanine crystal in Example 2(C) and Comparative Example 1, it was measured that the solvent-treated hydroxygallium phthalocyanine crystal of Example 2(C) had more regular particle size than that of Comparative Example 1.

EXAMPLE 3

A solution consisting of 10 parts of a zirconium compound ("Orgatics ZC540" produced by Matsumoto Seiyaku K.K.), 1 part of a silane compound ("A 1110" produced by Nippon Unicar Co., Ltd.), 40 parts of isopropyl alcohol, and 20 parts of butanol was applied to an aluminum support by dip coating and dried by heating at 150° C. for 10 minutes to form an undercoat layer having a thickness of 0.2 μm.

One part of the hydroxygallium phthalocyanine crystals obtained in Example 1 was mixed with 1 part of polyvinyl butyral ("S-Lec BM-S" produced by Sekisui Chemical Co., Ltd.) and 100 parts of n-butyl acetate, and the mixture was dispersed in a paint shaker together with glass beads for 1 hour. The resulting coating composition was applied onto the undercoat layer by dip coating and dried by heating at 100° C. for 10 minutes to form a charge generating layer having a thickness of about 0.2 μm.

In 20 parts of monochlorobenzene were dissolved 2 parts of a charge transporting material represented by formula (1):

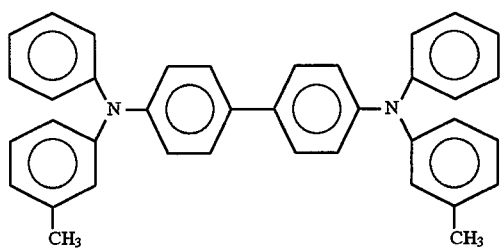

and 3 parts of a polycarbonate resin comprising a repeating unit represented by formula (2):

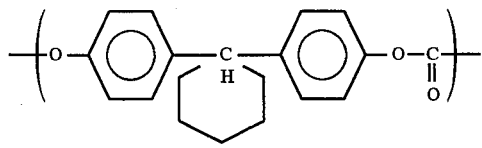

and the resulting coating composition was applied to the charge generating layer by dip coating and dried by heating at 120° C. for 1 hour to form a charge transporting layer having a thickness of 20 μm.

EXAMPLE 4 AND COMPARATIVE EXAMPLE 2

An electrophotographic photoreceptor was prepared in the same manner as in Example 3, except for using, as a charge generating material, the hydroxygallium phthalocyanine crystals obtained in Example 2 or Comparative Example 1.

Electrophotographic characteristics of the electrophotographic photoreceptors prepared in Examples 3 and 4 and Comparative Example 2 were evaluated by using a machine scanner as follows. The photoreceptor was charged to an initial surface potential of −800 V by a corona discharge under a high temperature and high humidity condition (28° C., 85% RH). After 0.538 second, the dark decay potential $V_{DDP}$ (V) was measured to obtain a dark decay rate $V_{DDR}$ (V) ($V_{DDR}=V_{DDP}-(-800)$). Then, the photoreceptor was exposed to monochromatic light of 780 nm which was isolated from light emitted from a tungsten lamp by means of a monochromator. The initial sensitivity dV/dE (kV·m²/J)) was measured. The results of these measurements are shown in Table 1 below.

TABLE 1

| | HOGaPc* | $V_{DDP}$ (V) | $V_{DDR}$ (V) | dV/dE (kV · m²/J) |
|---|---|---|---|---|
| Example 3 | Example 1 | −762 | 38 | 321 |
| Example 4 | Example 2 | −760 | 40 | 311 |
| Compar. Example 2 | Compar. Example 1 | −752 | 48 | 325 |

*HOGaPc: Hydroxygallium phthalocyanine

As can be seen from Table 1, the hydroxygallium phthalocyanine crystals prepared by the process of the present invention are useful as a photoconductive substance to provide an electrophotographic photoreceptor having high sensitivity and a small dark decay rate. The photoreceptor prepared by using the crystals of the present invention exhibits excellent chargeability and stable electrophotographic characteristics and thereby affords excellent image characteristics when applied to semiconductor laser printers, etc.

While the invention has been described in detail and with reference to specific embodiments thereof, it will be apparent to one skilled in the art that various changes and modifications can be made therein without departing from the spirit and scope thereof.

What is claimed is:

1. A process for producing a hydroxygallium phthalocyanine crystal, which comprises reacting a gallium compound with a compound for forming a phthalocyanine ring in a ratio of greater than 1:1 equivalent of the compound for forming the phthalocyanine ring to the gallium compound to prepare gallium phthalocyanine, subjecting the resulting gallium phthalocyanine to acid pasting to obtain a hydroxygallium phthalocyanine crystal having intense diffraction peaks at Bragg angles (2θ±0.2°) of 6.9°, 13.2° to 14.2°, 16.5° and 26.4° or of 7.0°, 13.4°, 16.6°, 26.0° and 26.7° in CuKα characteristic X-ray diffractometry, and transforming the resulting crystal by a solvent treatment into a hydroxygallium phthalocyanine crystal having intense diffraction peaks at Bragg angles (2θ±0.2°) of 7.5°, 9.9°, 12.5°, 16.3°, 18.6°, 25.1° and 28.3° in CuKα characteristics X-ray diffractometry.

2. A process for producing a hydroxygallium phthalocyanine crystal, which comprises removing an insoluble matter from an acid paste of gallium phthalocyanine in an acid pasting process to prepare a hydroxygallium phthalocyanine crystal having intense diffraction peaks at Bragg angles (2θ±0.2°) of 6.9°, 13.2° to 14.2°, 16.5° and 26.4° or of 7.0°, 13.4°, 16.6°, 26.0° and 26.7° in CuKα characteristic X-ray diffractometry, and transforming the resulting crystal by a solvent treatment into a hydroxygallium phthalocyanine crystal having intense diffraction peaks at Bragg angles (2θ±0.2°) of 7.5°, 9.9°, 12.5°, 16.3°, 18.6°, 25.1° and 28.3° in CuKα characteristic X-ray diffractometry.

3. A hydroxygallium phthalocyanine crystal having intense diffraction peaks at Bragg angles (2θ±0.2°) of 7.5°, 9.9°, 12.5°, 16.3°, 18.6°, 25.1° and 28.3° in CuKα characteristic X-ray diffractometry, which are obtained by a process comprising reacting a gallium compound with a compound for forming a phthalocyanine ring in a ratio of greater than 1:1 equivalent of the compound for forming the phthalocyanine ring to the gallium compound to prepare gallium phthalocyanine, subjecting the resulting gallium phthalocyanine to acid pasting to obtain a hydroxygallium phthalocyanine crystal having intense diffraction peaks at Bragg angles (2θ±0.2°) of 6.9°, 13.2° to 14.2°, 16.5° and 26.4° or of 7.0°, 13.4°, 16.6°, 26.0° and 26.7° in CuKα characteristic X-ray diffractometry, and transforming the resulting crystal by a solvent treatment.

4. A hydroxygallium phthalocyanine crystal having intense diffraction peaks at Bragg angles (2θ±0.2°) of 7.5°, 9.9°, 12.5°, 16.3°, 18.6°, 25.1° and 28.3° in CuKα characteristic X-ray diffractometry, which are obtained by a process comprising removing an insoluble matter from an acid paste of gallium phthalocyanine in an acid pasting process to prepare a hydroxygallium phthatocyanine crystal having intense diffraction peaks at Bragg angles (2θ±0.2°) of 6.9°, 13.2° to 14.2°, 16.5° and 26.4° or of 7.0°, 13.4°, 16.6°, 26.0° and 26.7° in CuKα characteristic X-ray diffractometry, and transforming the resulting crystal by a solvent treatment.

* * * * *